US008707426B1

(12) United States Patent
Ramzan et al.

(10) Patent No.: US 8,707,426 B1
(45) Date of Patent: Apr. 22, 2014

(54) METHOD AND APPARATUS FOR RESOLVING A COUSIN DOMAIN NAME TO DETECT WEB-BASED FRAUD

(75) Inventors: Zulfikar Ramzan, Cupertino, CA (US); Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 1481 days.

(21) Appl. No.: 12/128,084

(22) Filed: May 28, 2008

(51) Int. Cl.
*H04L 29/06* (2006.01)
*G06F 21/56* (2013.01)

(52) U.S. Cl.
CPC .......... *H04L 63/1483* (2013.01); *G06F 21/566* (2013.01); *G06F 2221/2119* (2013.01)
USPC ................. 726/22; 726/17; 726/21; 713/151

(58) Field of Classification Search
CPC ...................... H04L 63/1483; H04L 29/12594; H04L 61/30; H04L 63/1441; H04L 61/3025; G06F 17/28; G06F 17/2872; G06F 21/00; G06F 21/562
USPC .......................................................... 726/22
See application file for complete search history.

(56) References Cited

U.S. PATENT DOCUMENTS

| | | | |
|---|---|---|---|
| 7,559,085 B1 * | 7/2009 | Wahl | 726/22 |
| 7,644,127 B2 * | 1/2010 | Yu | 709/206 |
| 2002/0065842 A1 * | 5/2002 | Takagi et al. | 707/500 |

OTHER PUBLICATIONS

Fu et al., The Methodology and an Application to Fight against Unicode Attacks, Symposium on Usable Privacy and Security (SOUPS) 2005, Jul. 12-14, 2006, Pittsburgh, PA, USA.*
Anthony Y. Fu et al. "Safeguard against Unicode Attacks: Generation and Applications of UC-SimList." WWW May 23-26, 2006, Edinburgh, Scotland (ACM 1-59593-323-9/06/0005).*
Fu, Anthony Y. et al., "The Methodology and an Application to Fight against Unicode Attacks," downloaded from web site http://cups.cs.cmu.edu/soups/2006/proceedings/p91_fu.pdt on Aug. 5, 2008.

* cited by examiner

*Primary Examiner* — Taghi Arani
*Assistant Examiner* — Narciso Victoria
(74) *Attorney, Agent, or Firm* — Wilmer Cutler Pickering Hale and Dorr LLP (57) ABSTRACT

A method and apparatus for resolving a cousin domain name to detect web-based fraud is described. In one embodiment, the method for resolving cousin domain names of a legitimate domain name comprising applying at least one rule to a domain name to generate one or more candidate cousin domain names and comparing the at least one candidate cousin domain name with legitimate domain information to identify the legitimate domain name that is imitated by at least one portion of the domain name.

18 Claims, 6 Drawing Sheets

METHOD AND APPARATUS FOR RESOLVING A COUSIN DOMAIN NAME TO DETECT WEB-BASED FRAUD

BACKGROUND OF THE INVENTION

1. Field of the Invention

Embodiments of the present invention generally relate to computer network security systems and, more particularly, to a method and apparatus for securing computer systems from domain name abuse by identifying a legitimate domain name being imitated a cousin domain.

2. Description of the Related Art

Today many business and personal transactions occur through a computer and the Internet. Fraudsters (e.g., Spammers, phishers, hackers and the like) employ one or more techniques to illegally disrupt operations at the computer and/or obtain personal user information. For example, the fraudsters entice Internet users to navigate to fake web sites that resemble legitimate web sites (e.g., spoofed web sites) in order to obtain passwords and/or financial account information and/or infect the computer with malware, viruses or other web-based threats. Moreover, the fraudsters may use phishing techniques to set up convincing spoofs of the legitimate web sites to scam Internet users. The Internet users are tricked into entering personal information such as a credit card number, an account password and a social security number because the spoofed web site is designed to look exactly like the legitimate web site. Furthermore, the spoofed web site may be designed using the components and patterns from the legitimate web site.

Similarities between various character symbols (e.g., between letters or groups of letters (e.g., 'w' resembles 'vv'), between letters and punctuation marks (e.g., a pipe symbol ('|') resembles 'I' and a dollar symbol ('$') resembles 'S') and the like) may be exploited to disguise the domain name of the malicious web site by imitating the actual domain name of the legitimate web site. For example, the Internet users may not notice subtle visual differences between the character symbols and accidently click on a link for "www.vvellsfargo.com" due to the resemblance with the legitimate web site "www.wellsfargo.com". Sometimes, punctuation marks in the domain name may go undetected. For example, punctuation mark "!" resembles the number "1" and the letter "I" and may be overlooked by most Internet users.

Occasionally, the fraudsters may employ such look-alike characters to exploit certain visual characteristics of the actual domain names (e.g., wellsfargo.com) of the legitimate web sites in order to disguise cousin domain names (e.g., vvellsfargo.com) of the malicious web sites from current web-based fraud detection techniques. Generally, a cousin domain name comprises one or more look-alike characters that appear exactly like one or more characters of the legitimate domain name. Accordingly, the fraudster may register the cousin domain name (e.g., vvellsfargo.com) for the malicious web site.

Current spam and phish detection techniques may not operate properly if imitation or look-alike character symbols are employed by the fraudster. Such detection techniques may not recognize a string of characters "vvellsfargo.com" as the domain name for the legitimate web site "wellsfargo.com" and, as a result, will not block the web page or the email sent to the user having such a string. Consequently, "vvellsfargo.com" will be treated as an acceptable, legitimate domain name for a web site of a brand on the Internet by the current detection techniques.

Therefore, there is a need in the art for a method and apparatus for identifying a legitimate domain name being imitated by a cousin domain name to support web-based fraud detection.

SUMMARY

Embodiments of the present invention comprise a method and apparatus for resolving cousin domain names to detect web-based fraud. In one embodiment, a method for resolving the cousin domain names for a legitimate domain name comprises applying at least one rule to a first domain name to generate at least one candidate cousin domain name. The method further comprises comparing the at least one candidate cousin domain name with legitimate domain information to identify a second domain name as the legitimate domain name that is imitated by at least one portion of the first domain name.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
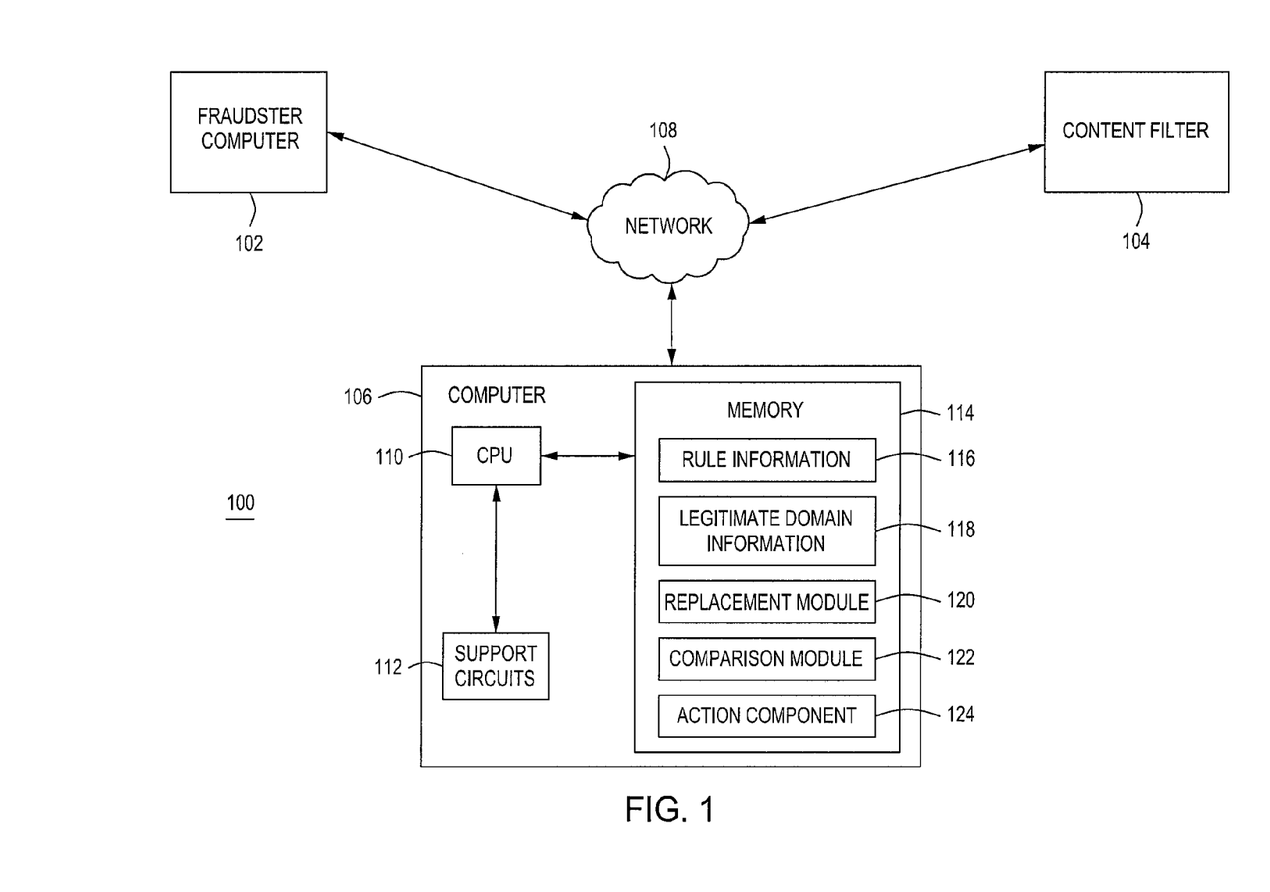
FIG. 1 is a block diagram of a system for identifying a legitimate domain name being imitated by a cousin domain name, according to an embodiment of the present invention.

FIG. 1 is a block diagram of a system 100 for identifying a legitimate domain name being imitated by a cousin domain name, according to an embodiment of the present invention. The system 100 includes a fraudster computer 102, a content filter 104, and a computer 106, each coupled to each other through a network 108.

The fraudster computer 102 includes one or more systems, resources and/or other devices, such as one or more software applications, servers, client computers, volumes, mobile computing devices (e.g., cell phones and personal digital assistants (PDAs)), storage devices, peripherals, networks and the like. The fraudster computer 102 is configured to employ various phishing and/or spamming techniques that use web-based content (e.g., web pages, messages, emails and/or the like) to entice Internet users to various malicious web sites. For example, the fraudster computer 102 may trick the Internet users through domain name abuse. Generally domain name abuse refers to the exploitation of a visual appearance of a domain name of the legitimate web site. For instance, the domain name for the malicious web site is used by the fraudster computer 102 to imitate the domain name of the legitimate web site. For example, a fraudster computer 102 may register "paypa1.com" and "vvellsfargo.com" to imitate the legitimate web sites "paypal.com" and "wellsfargo.com", respectively.

According to various embodiments of the present invention, the content filter 104 may be a gateway appliance, a web proxy computer, a browser component application and/or the like. In operation, the content filter 104 employs various spam and/or phish detection techniques to block web-based content associated with web-based fraud from being communicated and presented on a display at the computer 106. In one embodiment, the content filter 104 processes web-based content (e.g., web pages, emails and the like) intended for transmission to the computer 106 and identifies a string for a first domain name being used anywhere within the web-based content (e.g., anywhere in an email or a web page). In another embodiment, the identified first domain name may be normalized by the content filter 104 by removing common portions (e.g., "www") and the path name (e.g., ".com" or ".org" and the "like"). However, in certain cases, the content filter 104 may allow certain web pages and/or emails to pass through if the spam and/or phish detection techniques are not provided with the identification of a legitimate web site being imitated by the first domain name.

The computer 106 comprises a Central Processing Unit (CPU) 110, various support circuits 112 and a memory 114. The computer 106 refers to one or more systems, resources and/or devices, such as one or more software applications, servers, client computers, volumes, mobile computing devices (e.g., cell phones and personal digital assistants (PDAs)), storage devices, peripherals, networks, and the like. The CPU 110 may comprise one or more commercially available microprocessors or microcontrollers that perform data processing and storage. The various support circuits 112 facilitate the operation of the CPU 110 and may include clock circuits, power supplies, input/output circuits and/or the like. The memory 114 includes a read only memory, random access memory, disk drive storage, optical storage, magnetic storage, removable storage, and the like. The memory 114 further includes various software packages, such as a replacement module 120, a comparison module 122 and an action component 124. The memory 114 further includes various data, such as rule information 116 and legitimate domain information 118.

The network 108 comprises a communication system that connects computers by wire cable, fiber optics, and/or wireless links. The network 108 is facilitated by various types of well-known network elements, such as hubs, switches, routers, and the like. The network 108 may employ various well-known protocols to communicate information amongst the network resources. For example, the network 108 may be part of the Internet or Intranet using various communications infrastructure such as Ethernet, Wi-Fi, Wi-Max, General Packet Radio Service (GPRS), and the like.

The replacement module 120 and the comparison module 122 cooperate to identify a legitimate web site being imitated or spoofed by the first domain name. The replacement module 120 is configured to use the rule information 116 to generate the one or more candidate cousin domain names from the first domain name. Then, the comparison module 122 analyses the one or more candidate cousin domain names using the legitimate domain name information 118 to determine an imitation of a second (i.e., legitimate) domain name by the first domain name. The second domain name indicates a brand being spoofed by the spamming and/or phishing technique and is used to enhance the phish and/or spam detection techniques employed at the content filter 106.

Generally, the rule information 116 comprises at least one rule for replacing characters that may be employed to imitate or spoof a legitimate domain name by the phishing or a spamming technique. The at least one rule may be applied to the first domain name to replace one or more first characters that resemble one or more second characters. According to one embodiment of the present invention, the replacement module 120 is configured to apply the at least one rule of the rule information 116 to the normalized first domain name to generate the one or more candidate cousin domain names. In one embodiment, the replacement module 120 is configured to modify the first domain name by replacing the one or more first characters of the first domain name with the one or more second characters based on the at least one rule.

According to yet another embodiment of the present invention, the rule information 116 comprises one or more homographic rules. The replacement module 120 may replace one or more characters of the first domain name with the one or more homographic characters to generate one or more candidate cousin domain names. As mentioned above, the spamming and/or phishing techniques may use the one or more characters of the first domain name to imitate the one or more homographic characters of the one or more cousin legitimate domain name. For example, the replacement module 120 replaces the characters 'vv' ('v'+'v') with the character 'w'. As another example, the replacement module 120 replaces the characters 'rn' ('r'+'n') by the second character 'm'.

According to yet another embodiment of the present invention, the rule information 116 comprises one or more punctuation rules. The replacement module 120 may replace one or more punctuation marks of the first domain name with one or more characters to generate one or more candidate cousin domain names. For example, the replacement module 120 replaces a pipe symbol '|' character of the first domain name with a letter 'l' or a number "1". As another example, the replacement module 120 replaces a dollar symbol '$' character of the first domain name with a letter 'S'. As mentioned above, the spamming and/or phishing techniques may use the one or more punctuation marks to imitate the one or more characters of a legitimate domain name.

According to yet another embodiment of the present invention, the rule information 116 comprises one or more foreign language rules. The replacement module 120 may replace one or more foreign language characters of the first domain name with one or more native language characters to generate one or more candidate cousin domain names. For example, the replacement module 120 replaces character symbol 'â' of the first domain name with letter 'a', character symbol 'Ô' with letter 'O', character symbol 'ç' with letter 'C', character symbol 'β' with letter 'B', character symbol 'Ğ' with letter 'G', character symbol 'Ø' with letter 'O', character symbol ''Y' with letter 'Y', character symbol 'θ' with letter 'O', character symbol 'Ш' with letter 'W' and the like. As mentioned above, the spamming and/or phishing techniques may use the one or more foreign language characters to imitate the one or more native language characters of a legitimate domain name.

According to yet another embodiment of the present invention, the rule information 116 comprises one or more character insertion rules. The one or more character insertion rules refer to extraneous characters in the first domain name of which most users cannot recognize if presented on the computer 106. The replacement module 120 modifies the first domain name by removing a portion of the first domain name that comprises the extraneous characters. For example, the replacement module 120 removes a character symbol '.' from the domain name "www.wells.fargo.com" to produce the domain name "www.wellsfargo.com". As another example, the replacement module 120 removes a character symbol '-' from the domain name "www.wells-fargo.com".

According to yet another embodiment of the present invention, the rule information 116 comprises one or more conditions as to when to apply of the at least one rule for replacing one or more characters of the first domain name. The replacement module 120 is configures to determine that a particular condition for a rule is met and apply a corresponding rule to the first domain name to generate one or more candidate cousin domain names. For example, the replacement module 120 replaces a character 'ą' with a character 'a' when the character 'ą' is followed by a character 't' and/or vice versa.

The legitimate domain information 118 (e.g., a white list) is used by the comparison module 122 to identify a second domain name from one or more candidate cousin domain names. Generally the legitimate domain information 118 comprises one or more legitimate domain names (e.g., "wellsfargo.com") that are associated with commonly spoofed brands (e.g., the well-known bank WELLSFARGO). The second domain name includes a legitimate domain name that is being imitated by the first domain name and may be used to support a spam or phish filter. The legitimate domain name indicates the brand being spoofed.

In one embodiment, the comparison module 122 determines the legitimate domain name that is being imitated by the first domain name. In operation, the comparison module 122 is configured to compare a string for a candidate cousin domain name with a string for a legitimate domain name from the legitimate domain information 118 to identify the legitimate domain name that exactly or approximately matches the candidate cousin domain name.

In one embodiment, the comparison module 122 computes an edit distance between one or more legitimate domain names indicated by the legitimate domain information 118 and the one or more candidate cousin domain names. Generally, the edit distance is a measurement that represents a number of insertions and/or deletions required to obtain one string from another. In this case, the edit distance between a legitimate domain name and a candidate cousin domain name refers to a number of insertions and/or deletions between the legitimate domain name and the candidate cousin domain name. In one embodiment, the legitimate domain name having an edit distance computed by the comparison module 122 that is below a pre-defined threshold value is selected as the second domain name.

According to one embodiment of the present invention, an exact match between the candidate cousin domain name and the legitimate domain name indicates that the candidate cousin domain name and the legitimate domain name are identical or near identical (e.g., an identical or near identical string of characters). In another embodiment, a substring match between the portion of the candidate cousin domain and the legitimate domain name indicates that the candidate cousin domain name and the legitimate domain name are the same domain name. For example "paypal" is a substring of "paypal-secure". The legitimate domain name identified by the comparison module 122 may be selected as the second domain name since there is a strong likelihood that the legitimate domain name is being imitated by the first domain name.

In one embodiment, the action component 124 provides an anti-phishing filter with the imitated legitimate domain name (i.e., the second domain name). The legitimate domain name being imitate is used to determine the brand being spoofed by such a technique. Furthermore, the anti-phishing filter uses the imitated legitimate domain name to determine whether to classify a web page and/or an email message as malicious or safe. The phishing filter makes a better assessment of the web page or the email if provided information regarding the legitimate domain name being imitated.

In another embodiment, the action component 124 communicates a notification to the imitated legitimate domain name (i.e., the second domain name). The notification may indicate that web-based fraud associated with the legitimate domain name is occurring. According to one embodiment of the present invention, the action component 124 notifies the user of the imitated legitimate domain name (i.e., the second domain name). The identification of the imitated legitimate domain name (i.e., the second domain name) enables an improved classification of a web page or an email by the phishing filter. According to another embodiment of the present invention, the action component 124 notifies a domain name registrar of the imitated legitimate domain name.

Figure 2:
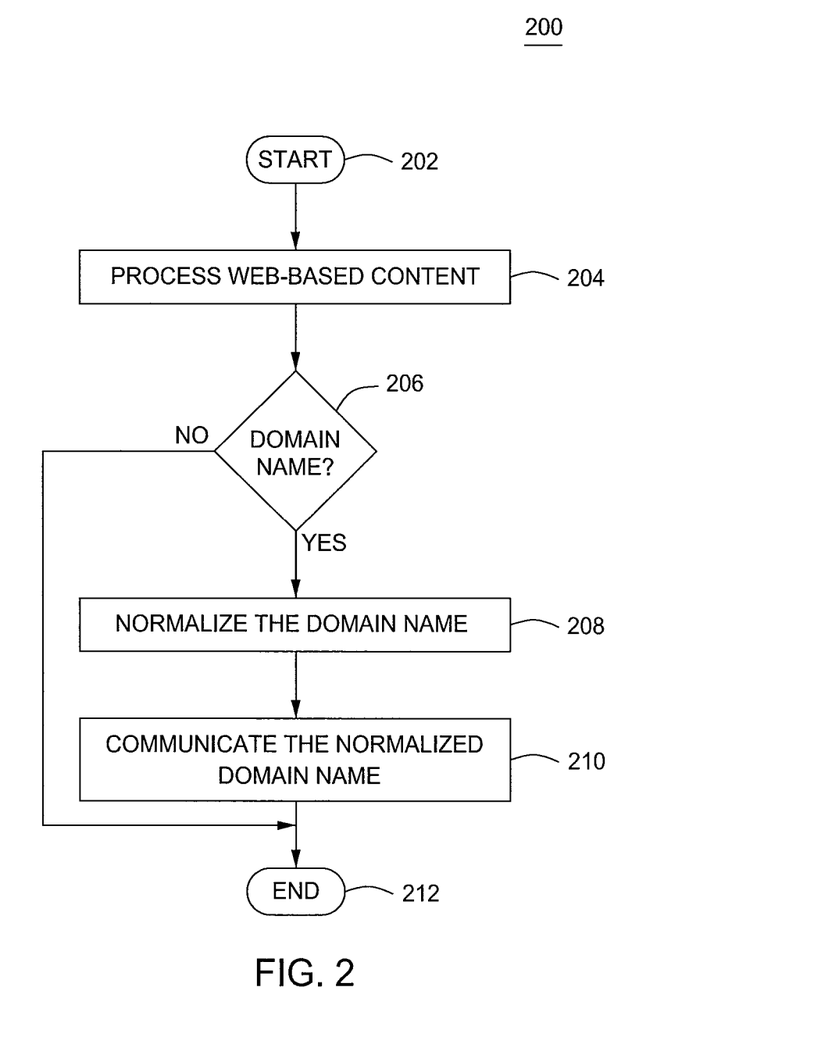
FIG. 2 is a flow diagram of a method for processing a domain name from web-based content, according to an embodiment of the present invention.

FIG. 2 depicts a flow diagram of a method 200 for processing a domain name from web-based content, according to one embodiment of the present invention. The method 200 begins at step 202 and proceeds to step 204.

At step 204, the web-based content (e.g., an email message, a web page and the like) is processed (e.g., by the content filter 104 of FIG. 1). According to one embodiment of the present invention, the content filter 104 may be a gateway appliance, a web proxy or a browser component that processes the web-based content. At step 206, a determination is made as to whether the web-based content includes a domain name. If the web-based content includes the domain name (option "YES"), the method 200 proceeds to step 208. At step 208, the domain name is normalized by eliminating common portions. For example, eliminating the common portions "www" at the beginning and path name (e.g., .com, .org and the like) at the end of the first domain name. At step 210, the normalized domain name is communicated (e.g., to the replacement module and/or the comparison module of the computer 106). As mentioned above, the normalized first domain name is communicated to the replacement module the replacement module 120 of FIG. 1) and/or the comparison module (the comparison module 122 of FIG. 1) and converted into one or more candidate cousin domain names according to the rule information (e.g., the rule information 116 of FIG. 1). At step 206, however, if the web-based content does not include the domain name (option "NO"), the method 200 proceeds to step 212. At step 212, the method 200 ends.

Figure 3:
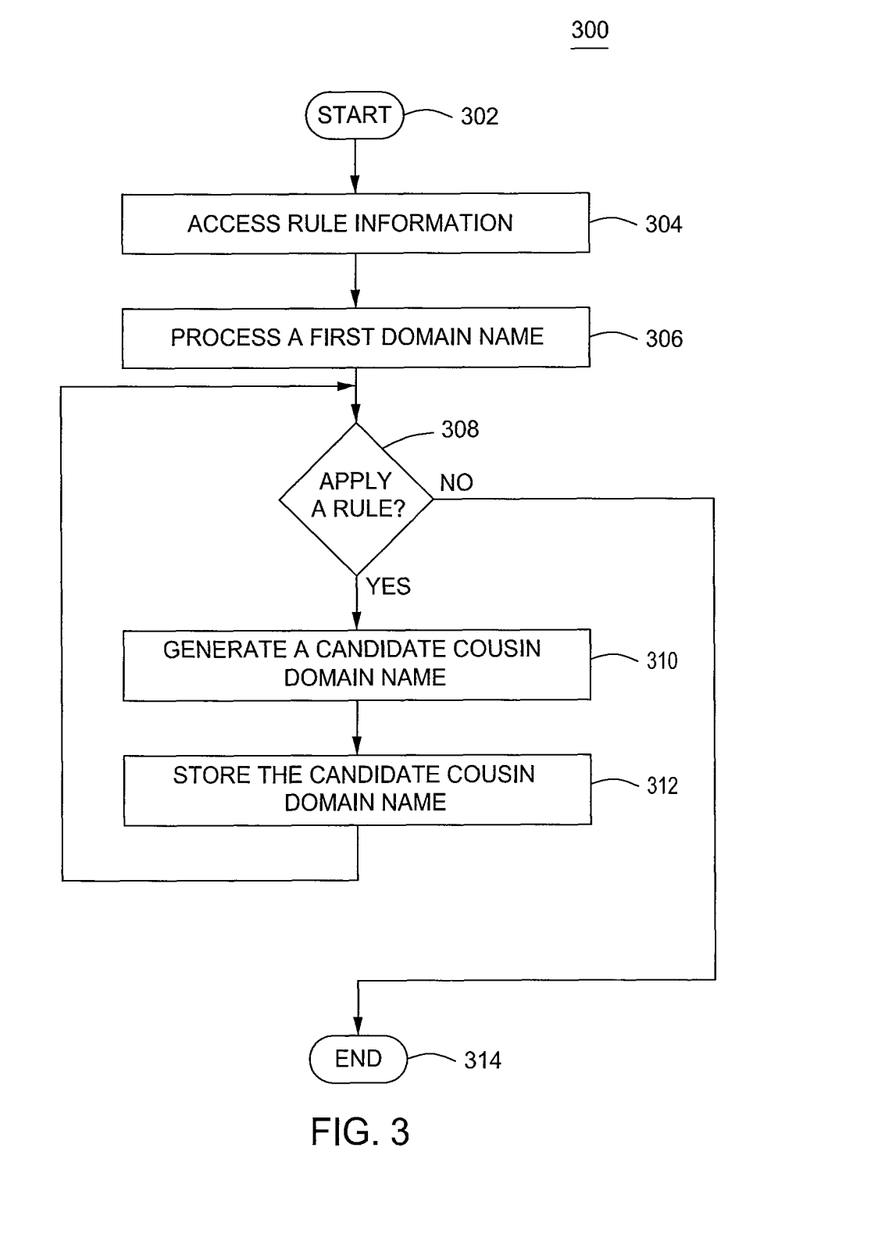
FIG. 3 is a flow diagram of a method for generating at least one candidate cousin domain name, according to an embodiment of the present invention.

FIG. 3 depicts a flow diagram of a method 300 for generating one or more candidate cousin domain names, according to an embodiment of the present invention. The method 300 begins at step 302 and proceeds to step 304.

At step 304, the rule information (e.g., the rule information 116 of FIG. 1 that comprises the at least one rule for replacing characters in a domain name) is accessed. At step 306, the first domain name (e.g., normalized first domain name communicated by the content filter (e.g., the content filter 104 of FIG. 1)) is processed. At step 308, a determination is made as to whether a rule of the at least one rule accessed from the rule information 116 is to be applied to the first domain name. If the rule is to be applied to the first domain name (e.g., by the replacement module 120) (option "YES"), the method 300 proceeds to step 310. At step 310, a candidate cousin domain name is generated (e.g., by applying the rule). At step 312, the candidate cousin domain name is stored. At step 308, however, if no rule of the at least one rule is not to be applied to the first domain name (option "NO"), the method 300 proceeds to step 314. At step 314, the method 300 ends.

Figure 4:
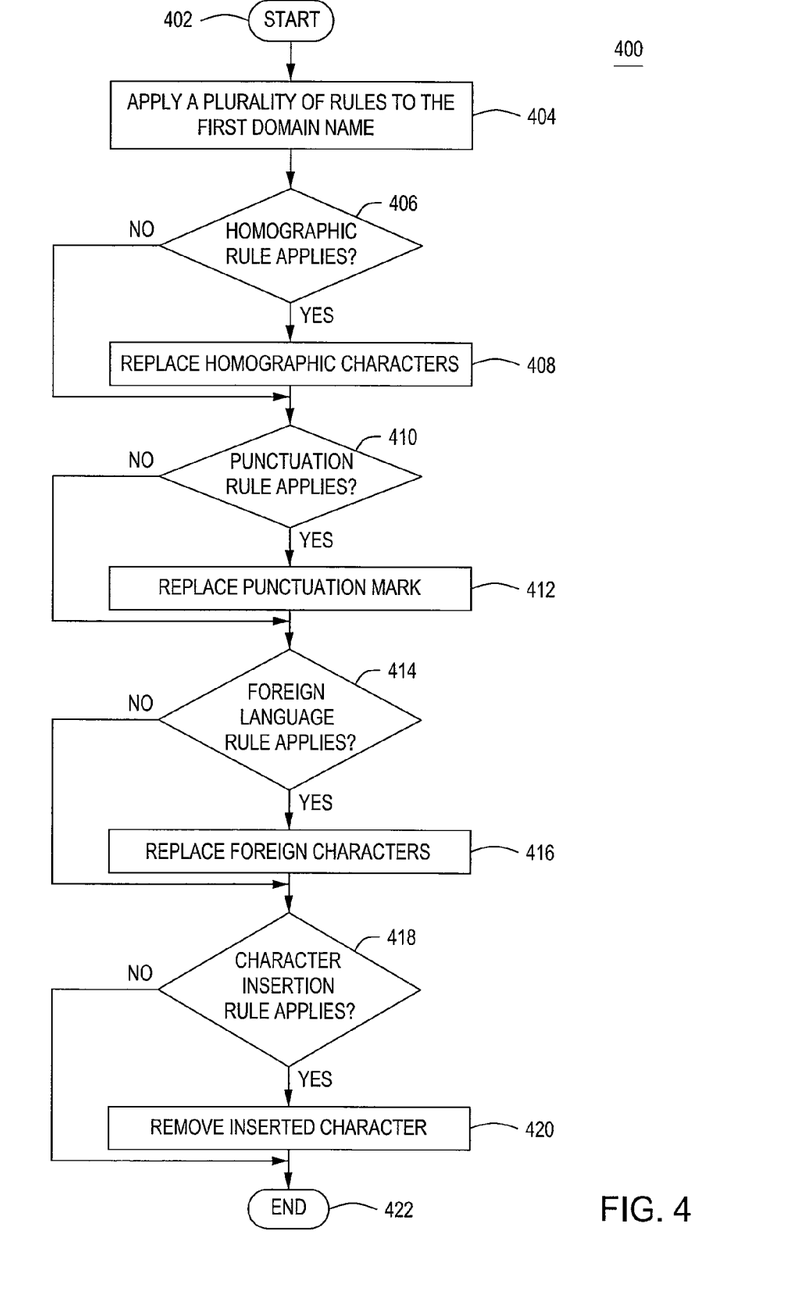
FIG. 4 is a flow diagram of a method for applying at least one rule to a first domain name, according to an embodiment of the present invention.

FIG. 4 depicts a flow diagram of a method 400 for applying at least one rule to a first domain name, according to an embodiment of the present invention. The method 400 begins at step 402 and proceeds to step 404.

At step 404, the at least one rule is applied to the first domain name to generate one or more candidate cousin domain names. At step 406, a determination is made as to whether a homographic rule is applied to the first domain name. If the homographic rule is applied to the first domain name (option "YES"), the method 400 proceeds to step 408. At step 408, the replacement module 120 replaces a first homographic character of the first domain name with a second homographic character. For example, characters 'vv' of the first domain name would be replaced by character 'w'. At step 406, however, if the homographic rule is not applied by the replacement module 120 to the first domain name (option "NO"), the method 400 proceeds to step 410.

At step 410, a determination is made as to whether a punctuation rule is applied by the replacement module 120 to the first domain name. If the punctuation rule is applied to the first domain name (option "YES"), the method 400 proceeds to step 412. At step 412, a punctuation mark of the first domain name is replaced with a character that resembles the punctuation mark. The punctuation mark is most likely used to imitate the character. For example, a pipe symbol CD character of the first domain name is replaced by the character letter 'l' and a dollar symbol ('$') characters of the first domain name is replaced by the character letter 'S'. At step 410, however, if the punctuation rule is not applied to the first domain name (option "NO"), the method 400 proceeds to step 414.

At step 414, a determination is made as to whether a foreign language rule is applied to the first domain name. If the foreign language rule is applied to the first domain name (option "YES"), the method 400 proceeds to step 416. At step 416, a foreign character of the first domain name is replaced with a native language character. For example, an 'â' character of the first domain name is replaced by the character 'a', a 'Ô' character of the first domain name is replaced by the character 'O', a 'ç' character of the first domain name is replaced by the character 'C', a 'β' character of the first domain name is replaced by the character 'B', a 'Ğ' character of the first domain name is replaced by the character 'G', a 'Ø' character of the first domain name is replaced by the character 'O', a 'Ÿ' character of the first domain name is replaced by the character 'Y', a 'θ' character of the first domain name is replaced by the character 'O', a 'Ш' character of the first domain name is replaced by the character 'W' and the like. At step 414, however, if the foreign language rule is not applied to the first domain name (option "NO"), the method 400 proceeds to step 418.

At step 418, a determination is made as to whether a character insertion rule is applied to the first domain name. If the character insertion rule is applied by the replacement module 120 to the first domain name (option "YES"), the method 400 proceeds to step 420. At step 420, removing the inserted character is removed from the first domain name. For example, a character '.' that is inserted in "www.wells.fargo.com" is removed according to the character insertion rule that results in the cousin domain name "www.wellsfargo.com". As another example, a character '-' that is inserted in "www.wells-fargo.com" is removed and results in the cousin domain name "www.wellsfargo.com". At step 418, however, if the character insertion rule is not applied by the replacement module 120 to the first domain name (option "NO"), the method 400 proceeds to step 422. At step 422, the method 400 ends.

Figure 5:
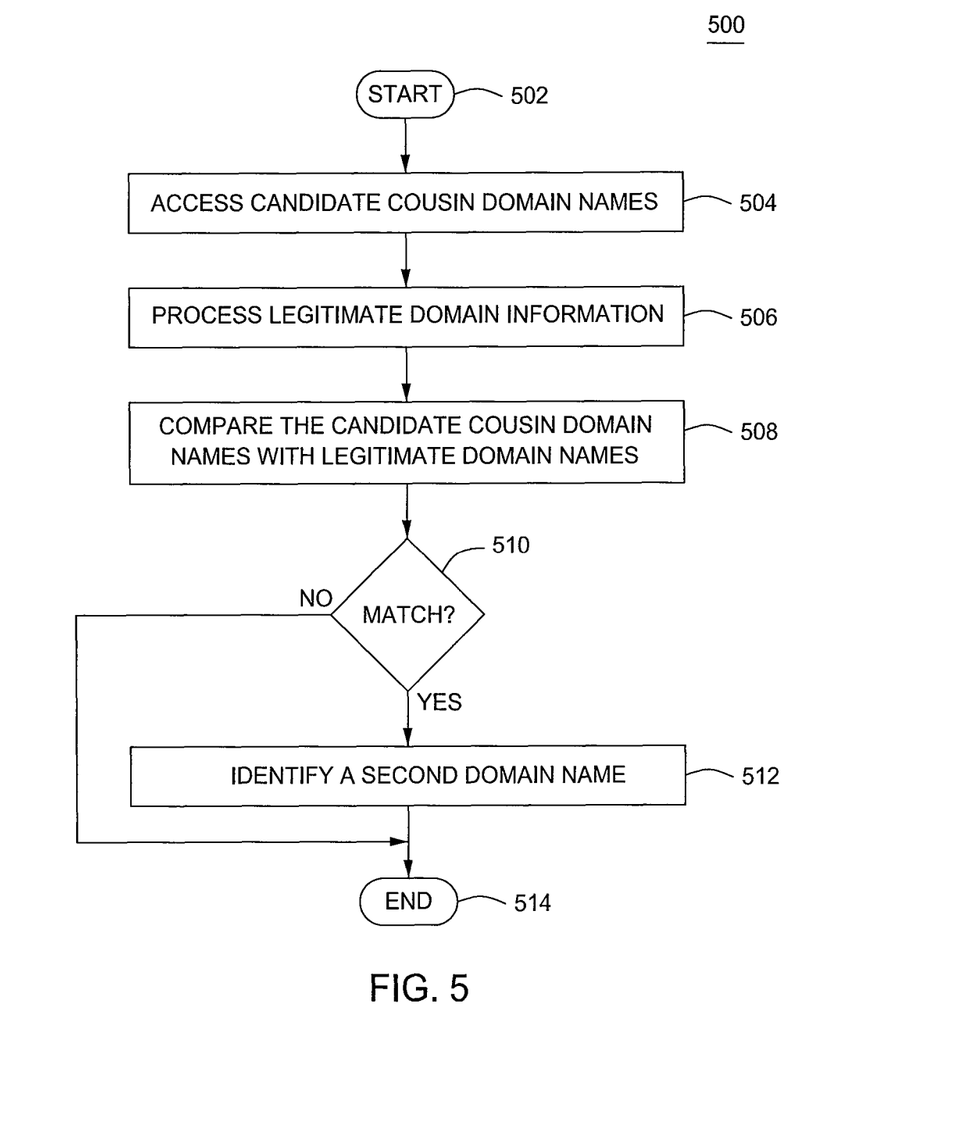
FIG. 5 is a flow diagram of a method for identifying a legitimate domain name being imitated by a cousin domain name, according to an embodiment of the present invention.

FIG. 5 depicts a flow diagram of a method 500 for identifying a legitimate domain name being imitated by a cousin domain name, according to an embodiment of the present invention. The method 500 begins at step 502 and proceeds to step 504.

Figure 6:
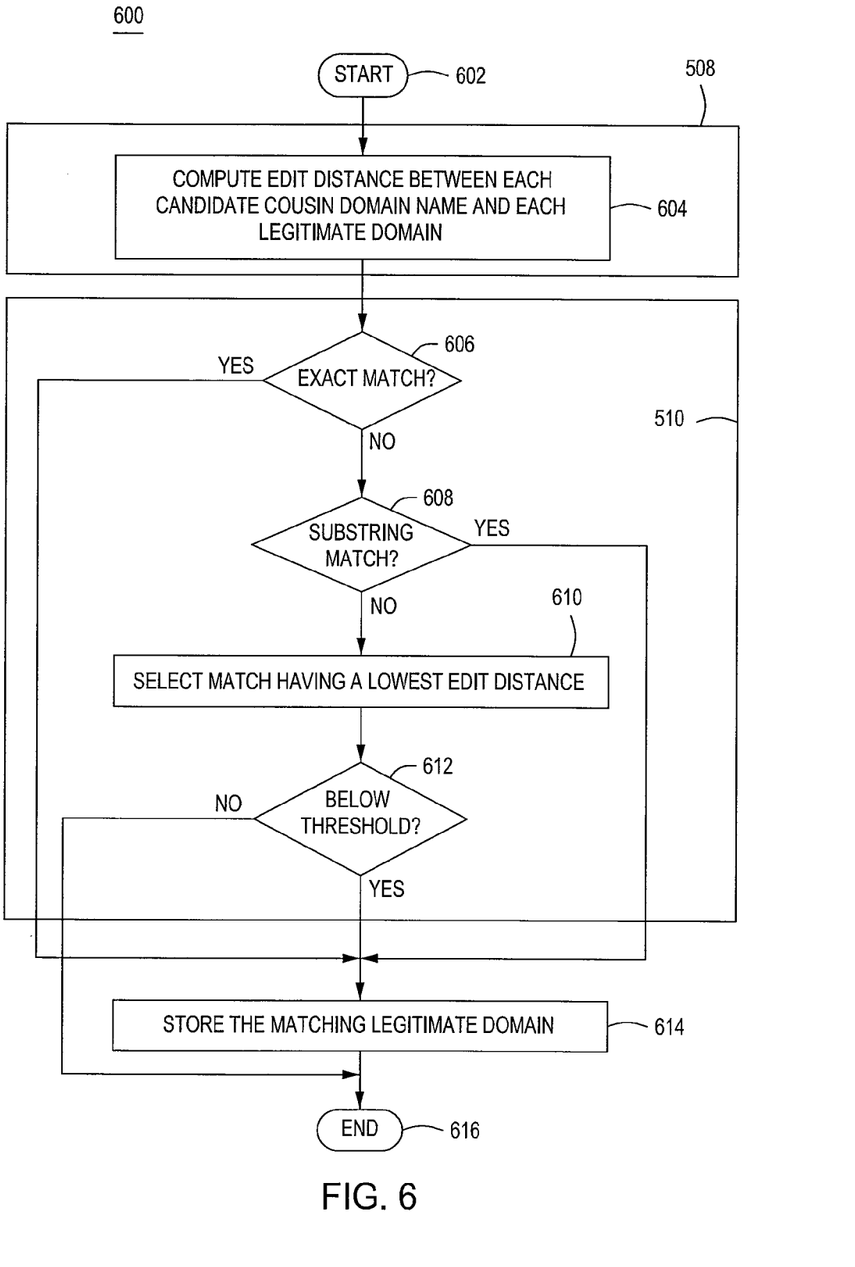
FIG. 6 is a flow diagram of a method for comparing at least one candidate cousin domain name with at least one legitimate domain names, according to an embodiment of the present invention.

At step 504, one or more candidate cousin domain names are accessed. In one embodiment, the one or more candidate cousin domain names are generated by the replacement module (e.g., the replacement module 120 of FIG. 1) and analyzed by the comparison module (e.g., the comparison module 122 of FIG. 1). At step 506, legitimate domain information (e.g., the legitimate domain information 118 of FIG. 1) is processed. The legitimate domain name information includes existing legitimate domain names that may be imitated to further phishing and/or spamming attacks. At step 508, the one or more candidate cousin domain names are compared with the legitimate domain names. In addition, the step 508 has been further described in the method 600 by a sequence of steps starting from step 602 to step 616.

At step 510, a determination is made as to whether a candidate cousin domain name of the one or more candidate cousin domain names matches (i.e., approximately or exactly) a legitimate domain name of the legitimate domain name information. If there is a match between the candidate cousin domain name and the legitimate domain name (option "YES"), the method 500 proceeds to step 512. In addition, the step 510 has been further described in the method 600 by a sequence of steps starting from step 606 to step 612. At step 512, the matching legitimate domain name is identified as a second domain name. At step 510, however, if there is no match between the one or more cousin domain names and the legitimate domain name information (option "NO"), the method 500 proceeds to step 514. At step 514, the method 500 ends.

FIG. 6 depicts a flow diagram of a method 600 for comparing one or more candidate cousin domain names with one or more legitimate domain names, according to an embodiment of the present invention. The method 600 begins at step 602 and proceeds to step 604.

At step 604, an edit distance between each candidate cousin domain name of the one or more candidate cousin domain names with each legitimate domain name of the legitimate domain information is computed. At step 606, a determination is made as to whether there is an exact match between a candidate cousin domain name of the one or more candidate cousin domain names and a legitimate domain name. If there is an exact match between the candidate cousin domain name and the legitimate domain name (option "YES"), the method 600 proceeds to step 614. At step 614, the legitimate domain name is stored and selected as the second domain name. In one embodiment, the candidate cousin domain name and the matching legitimate domain name have identical strings of characters.

At step 606, however, if there is no match between any candidate cousin domain name of the one or more cousin domain names and any legitimate domain name (option "NO"), the method 600 proceeds to step 608. At step 608, a determination is made as to whether there is a substring match between a portion of a candidate cousin domain and a legitimate domain name of the legitimate domain name information. If there is a substring match between the portion of the candidate cousin domain and the legitimate domain name (option "YES"), the method 600 proceeds to step 614. At step

614, the matching legitimate domain name is stored and/or selected as the second domain name. At step 608, however, if there is no substring match between any portion of the candidate cousin domain name of the one or more cousin domain names and any legitimate domain name (option "NO"), the method 600 proceeds to step 610. In one embodiment, the substring match between the portion of the candidate cousin domain and the legitimate domain name is identified by the comparison module. At step 610, a match having a lowest edit distance computer between a candidate cousin domain name and a legitimate domain name that is selected as the second domain name.

At step 612, a determination is made as to whether the computed edit distance of the selected match is below a pre-defined threshold value for edit distances. If the selected match has the edit distance that is below the pre-defined threshold (option "YES"), the method 600 proceeds to step 614. At step 614, the legitimate domain name of the selected match is stored and selected as the second domain name. At step 612, however, if the selected match does not have the edit distance that is below the pre-defined threshold (option "NO"), the method 600 proceeds to step 616. At step 616, the method 600 ends.

While the foregoing is directed to embodiments of the present invention, other and further embodiments of the invention may be devised without departing from the basic scope thereof, and the scope thereof is determined by the claims that follow.

The invention claimed is:

1. A method for resolving cousin domain names of a legitimate domain name comprising:
    applying, via at least one computer processor, at least one rule to a first domain name to generate at least one candidate cousin domain name, wherein applying the at least one rule further comprises modifying at least one character of the first domain name in accordance with the at least one rule to produce the at least one candidate cousin domain name;
    comparing the at least one candidate cousin domain name with legitimate domain name information to identify a second domain name that is imitated by at least a portion of the first domain name, wherein comparing the at least one candidate cousin domain name with legitimate domain name information comprises computing an edit distance between at least one legitimate domain name out of a plurality of legitimate domain names indicated by the legitimate domain name information and the at least one candidate cousin domain name, wherein comparing the at least one candidate cousin domain name with legitimate domain name information further comprises determining a match between a substring of the at least one candidate cousin domain name and a substring of a legitimate domain name indicated by the legitimate domain name information; and
    selecting a legitimate domain name out of the plurality of legitimate domain names as the second domain name based upon the computed edit distance.

2. The method of claim 1, wherein modifying the at least one first character of the first domain name further comprises replacing the at least one first character of the first domain name with at least one second character, wherein the at least one character is an imitation of the at least one second character.

3. The method of claim 2, wherein the at least one first character comprises a punctuation mark, wherein the punctuation mark is used to imitate a portion of the at least one second character.

4. The method of claim 2, wherein the at least one first character and the at least one second character are homographic.

5. The method of claim 2, wherein the at least one first character is defined by a foreign language and the at least one second character is defined by a native language.

6. The method of claim 1, wherein modifying the first domain name further comprises removing a portion of the at least one first character from the first domain name.

7. The method of claim 1, wherein comparing the at least one candidate cousin domain name further comprises determining a match between a candidate cousin domain name of the at least one cousin domain name and a legitimate domain name indicated by the legitimate domain name information, wherein the legitimate domain name is the second domain name.

8. The method of claim 1, wherein comparing the at least one candidate cousin domain name further comprising:
    selecting a legitimate domain name having a lowest computed edit distance as the second domain name.

9. The method of claim 1, wherein comparing the at least one candidate cousin domain name further comprising:
    selecting a legitimate domain name having a computed edit distance that is below a pre-defined threshold as the second domain name.

10. The method of claim 1 further comprising communicating the second domain name to an anti-phishing filter.

11. The method of claim 10 further comprising using the anti-phishing filter to classify at least one of a web page or an email message.

12. The method of claim 1 further comprising communicating a notification to the second domain name, wherein the notification indicates fraud associated with the second domain name.

13. An apparatus for resolving cousin domain names of a legitimate domain name, comprising:
    at least one processor configured to:
        convert a first domain name into at least one candidate cousin domain name according to rule information, wherein the rule information indicates at least one rule for replacing at least one character of the first domain name, wherein applying the at least one rule further comprises modifying at least one character of the first domain name in accordance with the at least one rule to produce a candidate cousin domain name;
        analyze the at least one candidate cousin domain name using legitimate domain name information to determine an imitation of a second domain name by the first domain name, wherein analyzing the at least one candidate cousin domain name using legitimate domain name information comprises computing an edit distance between at least one legitimate domain name out of a plurality of legitimate domain names indicated by the legitimate domain name information and the at least one candidate cousin domain name, wherein analyzing the at least one candidate cousin domain name using legitimate domain name information further comprises determining a match between a substring of the at least one candidate cousin domain name and a substring of a legitimate domain name indicated by the legitimate domain name information; and
        select a legitimate domain name out of the plurality of legitimate domain names as the second domain name based upon the computed edit distance; and at least one memory, coupled to the at least one processor, configured to provide the at least one processor with instructions.

14. The apparatus of claim 13 further comprising an action component to use the second domain name to train a filter for detecting and removing phish.

15. A system for resolving cousin domain names of a legitimate domain name, comprising:
- a content filter for normalizing a first domain name; and
- a computer, comprising:
    - a replacement module to convert the normalized first domain name into at least one candidate cousin domain name according to rule information, wherein the rule information indicates at least one rule for replacing at least one character of the normalized first domain name, wherein applying the at least one rule further comprises modifying at least one character of the first domain name in accordance with the at least one rule to produce a candidate cousin domain name;
    - a comparison module to analyze the at least one candidate cousin domain name using legitimate domain name information to determine an imitation of a second domain name by the first domain name, wherein analyzing the at least one candidate cousin domain name using legitimate domain name information comprises computing an edit distance between at least one legitimate domain name out of a plurality of legitimate domain names indicated by the legitimate domain name information and the at least one candidate cousin domain name, wherein analyzing the at least one candidate cousin domain name using legitimate domain name information further comprises determining a match between a substring of the at least one candidate cousin domain name and a substring of a legitimate domain name indicated by the legitimate domain name information; and
    - a selection module to select a legitimate domain name out of the plurality of legitimate domain names as the second domain name based upon the computed edit distance.

16. The system of claim 15, wherein the content filter processes web-based content to identify the first domain name.

17. The system of claim 16 further comprising an action component to use the second domain name to train a filter for detecting and removing phish.

18. The system of claim 17, wherein the action component notifies the second domain name as to the imitation of the second domain name.

* * * * *